UNITED STATES PATENT OFFICE.

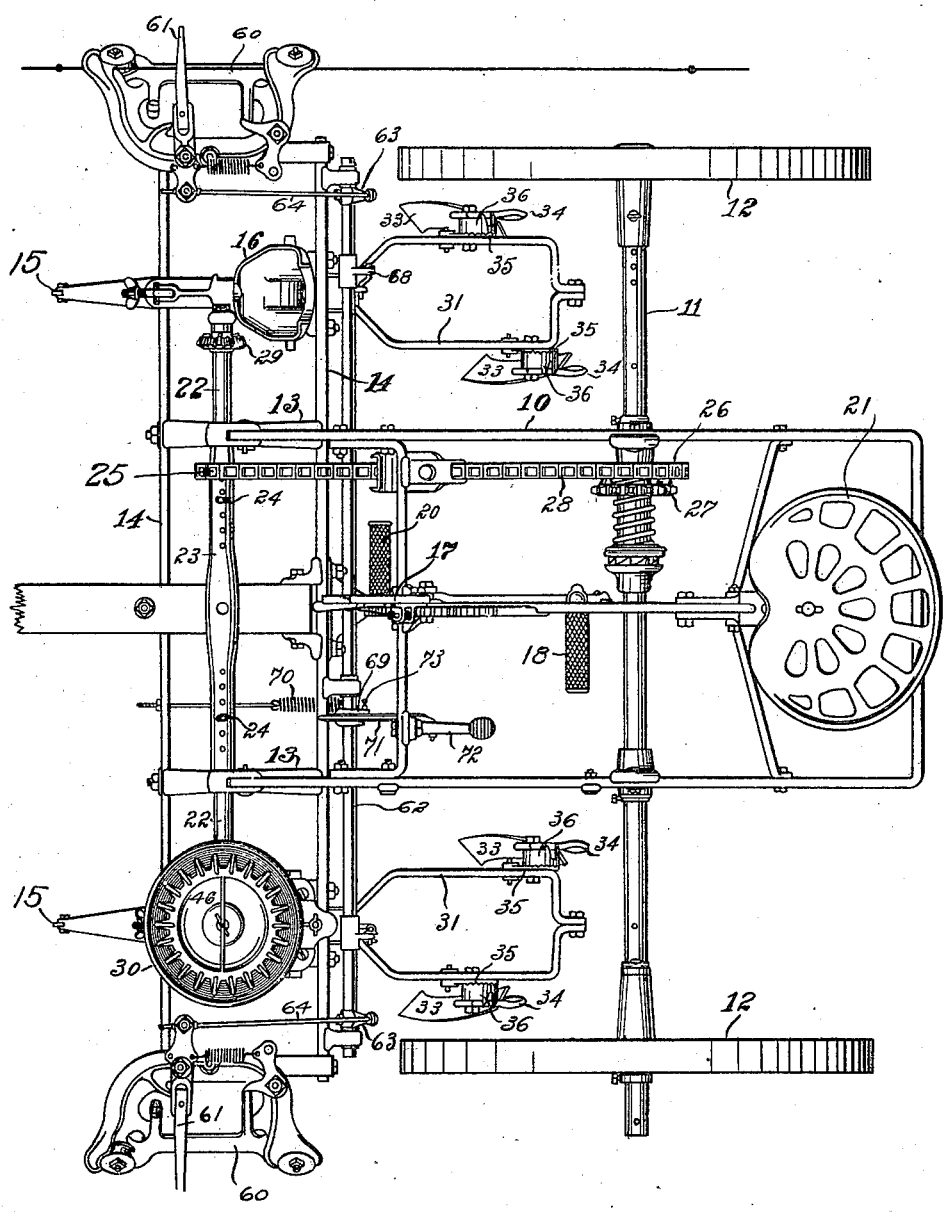

WILLIAM S. GRAHAM, OF CANTON, ILLINOIS, ASSIGNOR TO PARLIN AND ORENDORFF COMPANY, OF CANTON, ILLINOIS, A CORPORATION OF ILLINOIS.

COMBINED CORN AND COTTON PLANTER.

966,326.

Specification of Letters Patent.     Patented Aug. 2, 1910.

Application filed July 25, 1908. Serial No. 445,348.

*To all whom it may concern:*

Be it known that I, WILLIAM S. GRAHAM, a citizen of the United States, residing at Canton, in the county of Fulton, State of Illinois, have invented certain new and useful Improvements in Combined Corn and Cotton Planters, of which the following is a specification, reference being had to the accompanying drawings.

My invention relates to corn and cotton planters, and has for its object to provide a new and improved construction of machine which shall perform the functions heretofore performed by separate machines for planting corn and cotton seeds.

It is desirable in many instances to plant the cotton seed closer together than the corn, and it is the principal object of my invention to provide new and improved means in one machine for planting at different distances apart. I accomplish this object by the means illustrated in the drawing and hereinafter specifically described.

That which I believe to be new will be set forth in the claims.

The figure is a top or plan view of my improved machine, with one of the hoppers removed.

In the drawing, 10 indicates the main frame of the machine, journaled on axle 11, provided with carrying wheels 12, which are non-rotatably connected with said axle by means of pins passing through the hubs of the wheels and through the axle. As shown, the axle 11 extends some little distance beyond the frame 10 at each side of the machine, and is provided with a plurality of holes through which the retaining pins may be passed in order to hold said wheels in place at any of a plurality of positions. It will be evident that the wheels may be reversed, bringing the short ends of the hubs next to the frame so as to enable the wheels proper to be placed close beside the frame. The frame 10 is pivotally connected at its forward end to bars or brackets 13 which are bolted or otherwise secured between the cross-bars 14 of the runner-frame of the planter.

15 indicates runners or furrow-openers of the ordinary type, and 16 the ordinary runner-shanks or conductors mounted on the front-frame of the planter.

17 indicates the hand-lever by which the runners are adapted to be moved up and down, in the usual manner, the hand-lever mechanism being provided with steps 18 and 20 on opposite sides of the pivotal point of said lever by means of which the manipulation of the lever 17 and the adjustment of the runners are rendered easy.

21 indicates a seat suitably supported from the main frame 10.

22 indicates a divided shaft journaled in the brackets 13 of the front-frame of the planter. The two end portions of this shaft 22 project into a sleeve 23 to which they are connected by means of cotter pins 24, a plurality of holes being provided through said sleeve for such connection.

25 indicates a sprocket-wheel keyed or otherwise non-rotatably secured on the sleeve 23.

26—27 indicate different-sized sprocket-wheels mounted on the axle 11 so as to rotate therewith.

28 indicates a sprocket-chain connecting the sprocket-wheel 25 with either sprocket-wheel 26 or 27.

29 indicates bevel-gears one of which is keyed or otherwise suitably secured near the outside end of each portion 22 of the divided shaft.

30 indicates one of the seed-hoppers, the seed-dropping mechanism of which is operated by the gear 29. Inasmuch as it is desirable to plant cotton seed closer than corn, as set forth above, and as it is in general, sometimes desirable to plant either at varying distances apart, provision is made for shifting the seed-boxes 30 and the operating mechanism connected therewith laterally of the machine. When such a shift is made, it will be understood of course that, through the medium of the divided shaft 22 and the plurality of holes in which the cotter pins 24 may be inserted, the end portions 22 of the divided shaft and the bevel gears 29 may be shifted laterally to correspond with the position of the seed-boxes, the latter being shifted, together with their connected parts, in any approved manner.

For the purpose of covering the seed, I provide shovels 33 carried by standards 34 which are adjustably secured by means of corrugated bearing plates 35—36 upon shovel-frames 31 suitably secured at their front ends upon the front frame of the planter.

Check-rower mechanism of the ordinary type is provided, the check-rower head being indicated by 60, the forks by 61, and the usual transverse rock-shaft by 62, the connections between the fork 61 and the rock-shaft 62 being by means of arms 63 and links 64, so that the rock-shaft is given a partial rotation at each throw of the fork, suitable valve mechanism being provided in the shank or conductor adapted to be opened at each throw of the fork 62, as will be readily understood.

69 indicates a bracket non-rotatably mounted on the rock-shaft 62, having an upward and a downward extension. To the downward extension is attached one end of a spring 70 whose other end is suitably secured to the front-frame forward of said bracket. This spring serves to return the rock-shaft 62 to normal position after each throw of the check-rower mechanism. Pivotally attached to the upward extension of said bracket 69 is a link 71 which is also pivotally connected to a pivoted foot-lever 72, by means of which the operator can turn the rock-shaft 62 at the ends of the rows after the check-rower mechanism has ceased to operate in order to properly space the hills at that point, as will be readily understood.

If the planter is to be used as a drill, the spring 70 is merely to be disconnected from the downward extension of the bracket 69 and hooked over the pin 73 on the upward extension of said bracket. This spring then causes the rock-shaft to remain in its turned position, holding the valve in the shank constantly open, and permitting the seed to fall into the furrow as rapidly as it is discharged from the seed-hoppers, the arm 63 slipping forward along the link so as not to move out of normal position the forks 61 of the check-rower mechanism, as will be readily understood.

What I claim as my invention and desire to secure by Letters Patent is,—

1. In a combined corn and cotton planter, the combination with a front frame, a bracket mounted on said front frame at each side thereof, a rear frame pivotally mounted on said brackets, an axle carried by said rear frame, and carrying wheels fixed on said axle, of a sleeve bearing at its ends against said brackets, a divided seed-shaft each part of which is adapted to be secured to said sleeve at various positions of adjustment, and means for driving said sleeve from said axle.

2. In a combined corn and cotton planter, the combination with a front frame, a bracket mounted on said front frame at each side thereof, a rear frame pivotally connected to said brackets, an axle carried by said rear frame, and carrying wheels fixed on said axle, of a sleeve bearing at its ends against said brackets, a divided seed-shaft each part of which is journaled in one of said brackets and extends into and is secured to said sleeve at any desired position of adjustment therein, and means for driving said sleeve from said axle.

3. In a combined corn and cotton planter, the combination with a front frame, a bracket mounted on said front frame at each side thereof, a rear frame pivotally connected to said brackets, an axle carried by said rear frame, and carrying wheels fixed on said axle, of a sleeve bearing at its ends against said brackets, a divided seed-shaft each part of which is journaled in one of said brackets and extends into and is secured to said sleeve at any desired position of adjustment therein, a sprocket wheel fixed on said sleeve, a sprocket-wheel fixed on said axle in alinement therewith, and a sprocket-chain connecting said two sprocket wheels.

4. In a combined corn and cotton planter, the combination of a frame, an axle carried by said frame, carrying wheels fixed on said axle, a sleeve, a divided seed-shaft each part of which extends into and is secured to one end of said sleeve at any desired position of adjustment therein, a sprocket wheel fixed on said sleeve, a sprocket-wheel fixed on said axle in alinement therewith, a sprocket-chain connecting said two sprocket-wheels, and means adjacent to the ends of said sleeve for revolubly supporting the parts of said seed-shaft and adapted to hold said sleeve against movement transversely of said frame.

WILLIAM S. GRAHAM.

Witnesses:
 CHAS. W. GRAY,
 BEN B. WALLACE.